Feb. 17, 1931.   L. M. WOOLSON   1,793,150
INTERNAL COMBUSTION ENGINE
Filed Nov. 14, 1923

Inventor
Lionel M. Woolson
By Milton Tibbetts
Attorney

Patented Feb. 17, 1931

1,793,150

UNITED STATES PATENT OFFICE

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN

INTERNAL-COMBUSTION ENGINE

Application filed November 14, 1923. Serial No. 674,632.

This invention relates to internal combustion engines and particularly to the pistons thereof.

One of the objects of the present invention is to provide a light and strong piston.

Another object of the invention is to provide a piston with large bearing surfaces on the sides remote from the piston pin ends and with no bearing surface adjacent the piston pin ends whereby expansion of the piston will not tend to force the pin bosses against the cylinder.

Another object of the invention is to provide a piston with the lightest possible webs for supporting the pin bosses consistent with the required strength.

Other objects of the invention will appear from the following description taken in connection with the drawings, which form a part of this specification, and in which.

Figures 1, 2:
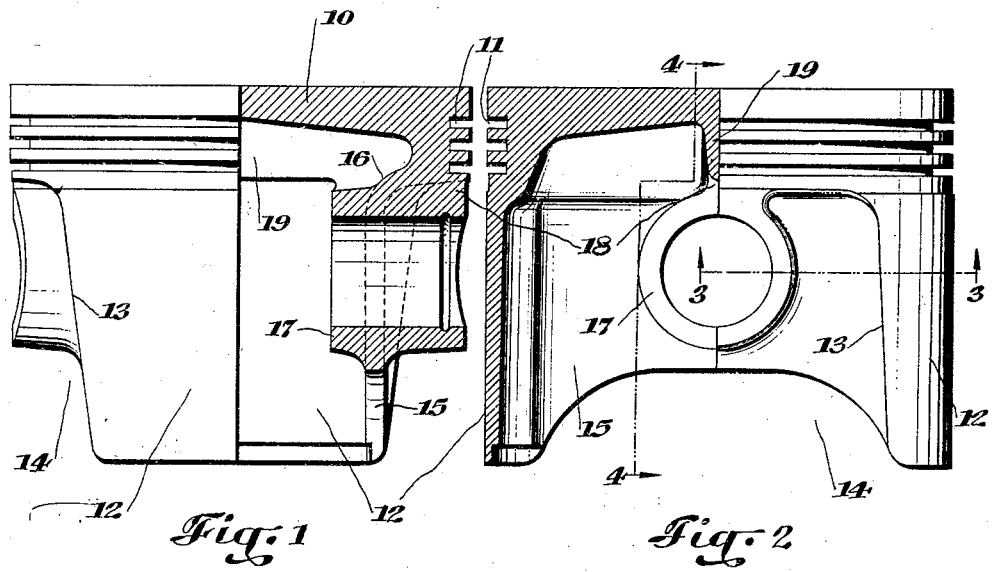
Fig. 1 is a part elevation and part longitudinal section through a piston embodying the invention, the section of this view being substantially on the line 1—1 of Fig. 3.
Fig. 2 is a view similar to Fig. 1 but taken at substantially right angles thereto and the section being substantially on the line 2—2 of Fig. 3.
Figures 3, 4:
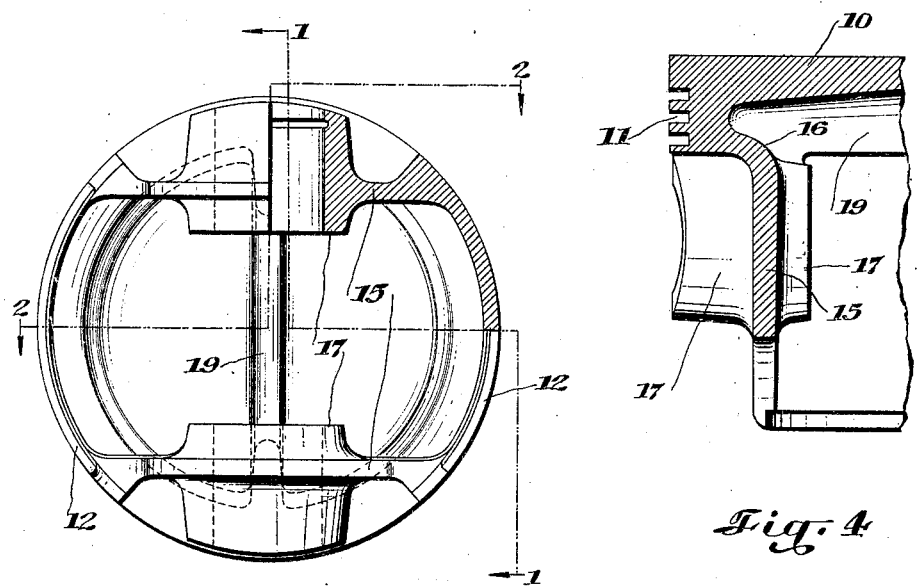
Fig. 3 is a view looking up under Fig. 2 with part being cut away substantially on the line 3—3 of Fig. 2.
Fig. 4 is a section substantially on the line 4—4 of Fig. 2.

Referring to the drawings, 10 represents the head or ring portion of the piston. This part of the piston is formed with rather thick walls and it is provided with a series of circumferential grooves 11 for the piston rings.

Connected to and shown as integrally united with the piston head, are two skirts or skirt portions 12. These skirts are directly united to the piston head at the periphery of the head and they are arranged on opposite sides of the head so that they will form large bearing surfaces in the engine cylinder. Each skirt extends substantially ninety degrees around the head thus leaving a space of substantially ninety degrees between the side edges of the skirts, these spaces being indicated at 14 in the drawings. Thus the piston below the head has a bearing on the cylinder wall only on its sides which are remote from the ends of the piston pin. The extreme side edges 13 of the skirts are made slightly diagonal as shown particularly in Figs. 1 and 2, to prevent scoring the cylinders.

The sides of the skirts 12 are connected to each other by a pair of webs 15. These webs are integrally united with the skirts at or adjacent their side edges and the parts of the webs adjacent the head are curved outwardly as shown at 16 and are there integrally united with the head. Mounted in or formed as an integral part of the webs 15 are separated bosses 17 for the piston pins. These bosses are near the head ends of the webs and are in fact integrally united with the head as shown at 18 in Figs. 1 and 2.

A connecting rib 19 is formed integrally with the head and extends across the head from one boss 17 to the other. This rib also connects the inner end of each boss with the inner face of the head of the piston.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. A piston consisting of a single integral skeleton structure comprising a head having a plurality of ring grooves, oppositely arranged skirts connected to the head, each skirt extending only partly around the head and having longitudinal edges at an angle to each other, said longitudinal edges extending from immediately adjacent the lowermost ring groove to the lower edge of the skirt, pin bosses having their outer ends immediately adjacent to and integral with the head, and webs integral with the head, the bosses and the skirts and connecting the diagonal longitudinal edges of the skirts.

2. A piston consisting of a single integral skeleton structure comprising a head having a plurality of ring grooves, oppositely arranged skirts connected to the head, each skirt extending only partly around the head and having longitudinal edges at an angle to each other, said longitudinal edges extending from immediately adjacent the lowermost ring groove to the lower edge of the skirt, pin bosses having their outer ends immediately adjacent to and integral with the head, webs integral with the head, the bosses and the skirts and connecting the diagonal longitudinal edges of the skirts, and a web integral with the head and with the pin bosses extending longitudinally of the pin bosses and having its lower edge substantially parallel to the exterior plane surface of the piston head.

In testimony whereof I affix my signature.

LIONEL M. WOOLSON.